US007003793B2

(12) United States Patent
Hwang et al.

(10) Patent No.: US 7,003,793 B2
(45) Date of Patent: Feb. 21, 2006

(54) SYSTEM FOR PROVIDING VIDEO-ON-DEMAND SERVICES IN WIRELESS NETWORK ENVIRONMENT AND METHOD THEREFOR

(75) Inventors: Jae-sik Hwang, Seongnam (KR); Young-keun Kim, Pucheon (KR)

(73) Assignee: Samsung Electronics Co., Ltd., Kyunki-do (KR)

( * ) Notice: Subject to any disclaimer, the term of this patent is extended or adjusted under 35 U.S.C. 154(b) by 962 days.

(21) Appl. No.: 09/771,633

(22) Filed: Jan. 30, 2001

(65) Prior Publication Data

US 2001/0056578 A1 Dec. 27, 2001

(30) Foreign Application Priority Data

Jun. 23, 2000 (KR) ................ 2000-34813

(51) Int. Cl.
*H04N 7/173* (2006.01)
*H04N 7/16* (2006.01)

(52) U.S. Cl. .................. 725/91; 725/114; 725/138; 725/144

(58) Field of Classification Search .............. 725/86, 725/87, 88, 91, 92, 98, 100
See application file for complete search history.

(56) References Cited

U.S. PATENT DOCUMENTS

| 5,991,279 | A | * | 11/1999 | Haugli et al. ............. 370/311 |
| 6,184,878 | B1 | * | 2/2001 | Alonso et al. ............ 725/109 |
| 6,543,053 | B1 | * | 4/2003 | Li et al. .................. 725/88 |
| 6,674,994 | B1 | * | 1/2004 | Fell et al. ................ 455/3.06 |
| 2002/0059402 | A1 | * | 5/2002 | Belanger .................. 709/220 |
| 2003/0203732 | A1 | * | 10/2003 | Erola ...................... 455/422.1 |

FOREIGN PATENT DOCUMENTS

| GB | 2 298 544 B1 | 9/1996 |
| JP | 10-32790 B1 | 2/1998 |
| JP | 2000-92450 B1 | 3/2000 |
| WO | WO 00/67470 A1 | 11/2000 |
| WO | WO 01/15397 A1 | 3/2001 |

OTHER PUBLICATIONS

Media Translation Based on QOS Requirement of Device & Services.

\* cited by examiner

*Primary Examiner*—Vivek Srivastava
*Assistant Examiner*—Joseph G. Ustaris
(74) *Attorney, Agent, or Firm*—Sughrue Mion, PLLC

(57) ABSTRACT

A system for providing video-on-demand (VOD) services and Internet services in a wireless network environment. A VOD terminal displays predetermined video information. A wireless telecommunications server provides a wireless telecommunications service menu for selection by the VOD terminal. A VOD server provides service information related to the VOD which was selected from the service menu provided by the wireless telecommunications server, by the VOD terminal. An encoder encodes predetermined content input from the outside into a predetermined format to be stored in the VOD server. A converter coverts predetermined content input through the Internet into a predetermined format to be stored in the VOD server. According to the system, a VOD terminal user can receive VOD services and Internet services through a WAP in a wireless telecommunications environment so that information usage and satisfaction can be maximized.

7 Claims, 4 Drawing Sheets

US 7,003,793 B2

SYSTEM FOR PROVIDING VIDEO-ON-DEMAND SERVICES IN WIRELESS NETWORK ENVIRONMENT AND METHOD THEREFOR

BACKGROUND OF THE INVENTION

1. Field of the Invention

The present invention relates to a system and method for providing information services, and more particularly, to a system for providing video-on-demand services and Internet services in a wireless network environment and a method therefor.

2. Description of the Related Art

Wireless Internet is the use of the Internet without a wired connection. Although the Internet or PC communications can be enjoyed without wires thanks to developments in mobile telecommunications, the number of users who use the Internet when they move from one place to another is still limited. This is because the transmission speeds of most mobile phones currently used are limited to 9.6–14.4 Kbps. Therefore, communications of Internet data without special processing takes much time and on-air telecommunications costs are high. When purchase expenses for necessary devices, such as a computer, a wireless modem, and connecting cables, are added to the costs, it would appear that wide spread use of mobile communications of Internet will take a long time.

Four multinational companies, Ericsson, Motorola, Nokia and Unwired Planet, proposed a wireless application protocol (WAP) for the first time in 1997, and since then, various companies all over the world, including service providers, equipment manufacturers, and application providers, are participating in the development of the WAP protocol.

WAP is a generic name for a protocol that enables the use of the Internet from a small wireless terminal such as a mobile phone or a personal data assistant (PDA). Previously, in order to use the Internet with a mobile phone, a notebook computer with an installed modem card for a mobile phone had to be connected to a terminal. However, the WAP has enabled Internet communications using the mobile phone terminal itself.

Since unlike existing mobile phone services, a service using the WAP uses Internet technologies that are being standardized globally, a wide range of services can be provided. Currently, diverse services are being prepared, and among them are diverse communication tools such as an on-line information service.

In an information service, voice services or partial character services have previously been provided. However, when a WAP technology is adopted, information services can be received in a place registered by a pre-setting, even when a user is away from home. When this service is provided, a user does not need dial a predetermined number to find the information the user wants.

However, wireless services using the WAP have been limited to text transmission so far. Therefore, a technology which can add multimedia functions to a wireless terminal having the WAP for text transmission so that the terminal can receive diverse services is required.

SUMMARY OF THE INVENTION

To solve the above problems, it is an object of the present invention to provide a video-on-demand (VOD) service providing system for providing VOD services and Internet services through a wireless application protocol (WAP) in a wireless network environment.

It is another object to provide a VOD service providing method for providing VOD services and Internet services through a WAP in a wireless network environment.

To accomplish the above object of the present invention, there is provided a system for providing video-on-demand (VOD) services in a wireless network environment, the system having a VOD terminal for displaying predetermined video information; a wireless telecommunications server for providing predetermined wireless telecommunications service menu so that the VOD terminal can select it; a VOD server for providing service information related to the selected VOD item, in the service menu provided by the wireless telecommunications server, by the VOD terminal; an encoder for encoding predetermined content input from the outside into a predetermined format to be stored in the VOD server; and a converter for converting predetermined content input through the Internet into a predetermined format to be stored in the VOD server.

To accomplish another object of the present invention, there is also provided a method for providing VOD services in a wireless network environment including a VOD terminal, a wireless telecommunication service support server for providing wireless telecommunications services, a VOD server for providing predetermined video and voice services to the VOD terminal, the method having the steps of (a) selecting in the VOD terminal a VOD service menu, after connected to the wireless telecommunications service support server; (b) providing predetermined information related to the VOD item provided by the VOD server, to the VOD terminal in response to the selection; and (c) receiving a VOD service in the VOD terminal using the predetermined information.

BRIEF DESCRIPTION OF THE DRAWINGS

The above objects and advantages of the present invention will become more apparent by describing in detail a preferred embodiment thereof with reference to the attached drawings, in which.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to one skilled in the art.

Figure 1:
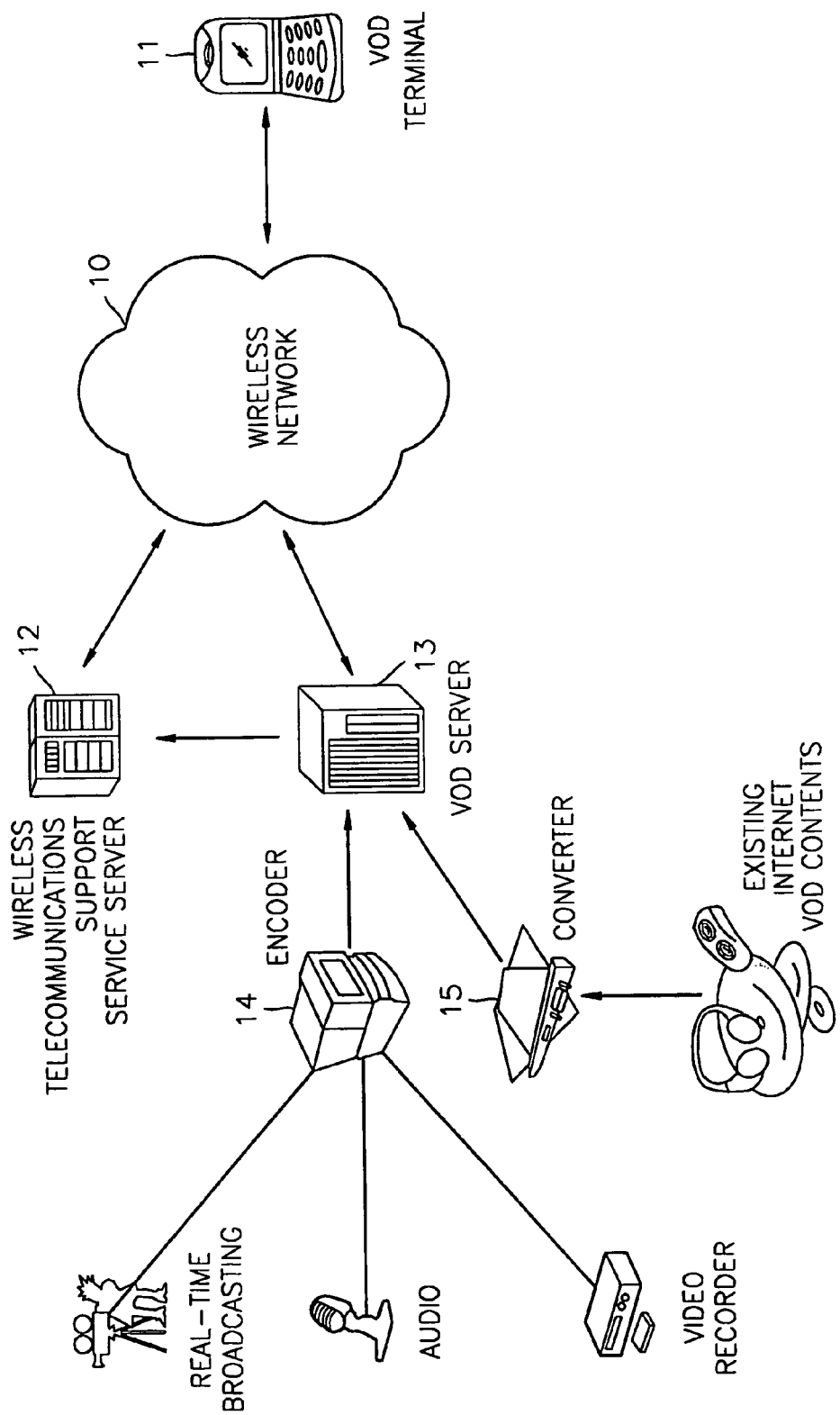
FIG. 1 is a schematic diagram showing the structure of a system for providing a video-on-demand (VOD) service in a wireless network environment according to the present invention.

FIG. 1 is a schematic diagram showing the structure of a system for providing a video-on-demand (VOD) service in a wireless network environment according to the present invention.

Referring to FIG. 1, the system includes a wireless network 10, a VOD terminal 11, a wireless telecommunications service support server 12, a WAP VOD server 13 (hereinafter referred to as "VOD server") which provides VOD-related services among wireless telecommunications services provided by the wireless telecommunications service support server 12, to the VOD terminal 12, an encoder 14 which encodes predetermined programs (hereinafter referred to as "contents"), including real-time broadcasts, audio, video recorders, which are input from the outside and provided by VOD information suppliers, in the form of wireless communications information, and a converter 15 which converts the predetermined content input through the Internet in the form of wireless communications information.

Figure 2:
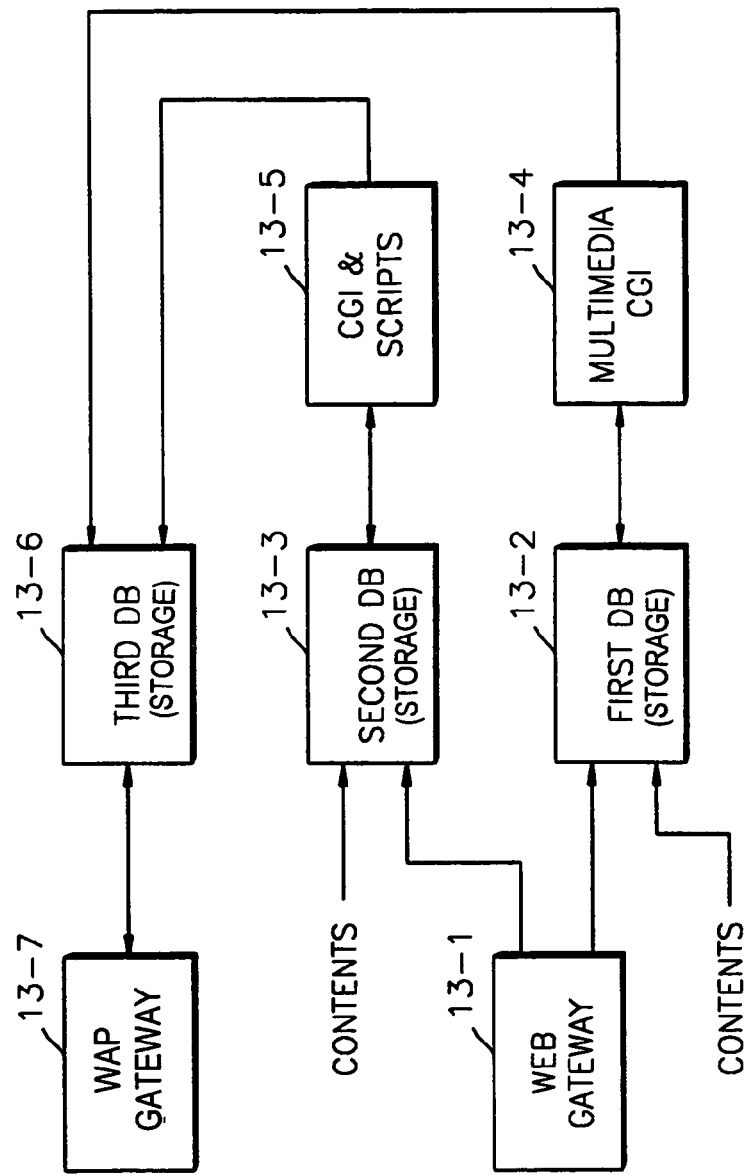
FIG. 2 is a detailed diagram of the wireless application protocol (WAP) VOD server shown in FIG. 1.

FIG. 2 is a detailed diagram of the wireless application protocol (WAP) VOD server shown in FIG. 1.

The VOD server 13 shown in FIG. 1 includes a web gateway 13-1 for sending Internet information; a first database (hereinafter referred to as "DB") 13-2 for storing video information among Internet information input through the web gateway 13-1 or contents information input from the outside; a second database 13-3 for storing information other than video information among Internet information input through the web gateway 13-1 or contents information input from the outside; a multimedia common gateway interface (CGI) 13-4 for converting video information stored in the first DB 13-2 into an image directory or file appropriate for a wireless telecommunications environment; CGI and scripts 13-5 for converting non-video information stored in the second DB 13-3 into wireless markup language (WML) data appropriate for a wireless telecommunications environment; a third DB 13-6 for storing the WML and the image directory and file converted by the multimedia CGI 13-4 and CGI and scripts 13-5, respectively; and a WAP gateway 13-7 for wirelessly sending information stored in the third DB 13-6.

Figure 3:
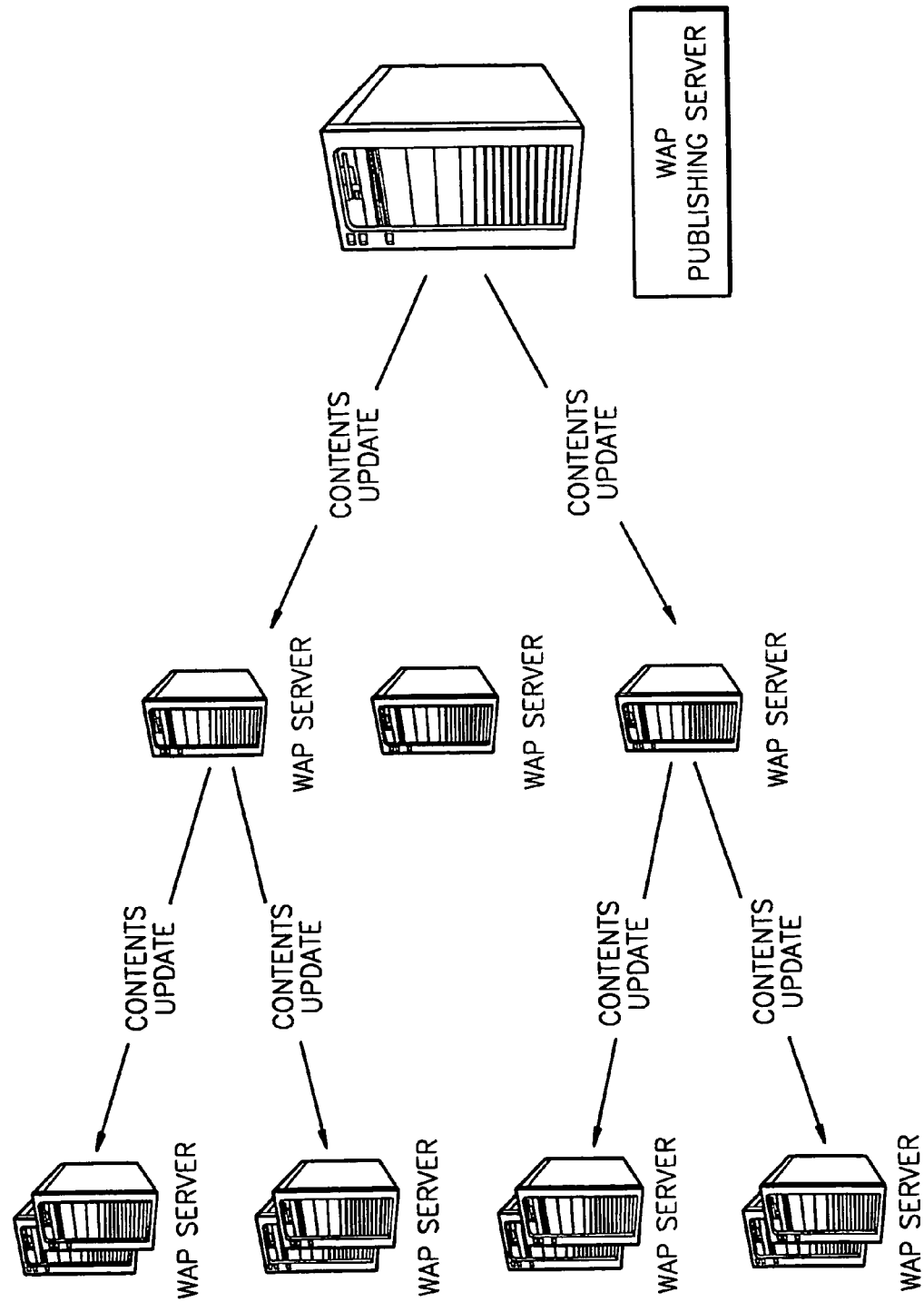
FIG. 3 illustrates the scope of applications of the WAP VOD server shown in FIG. 1.

FIG. 3 illustrates the scope of applications of the WAP VOD server shown in FIG. 1.

Figure 4:
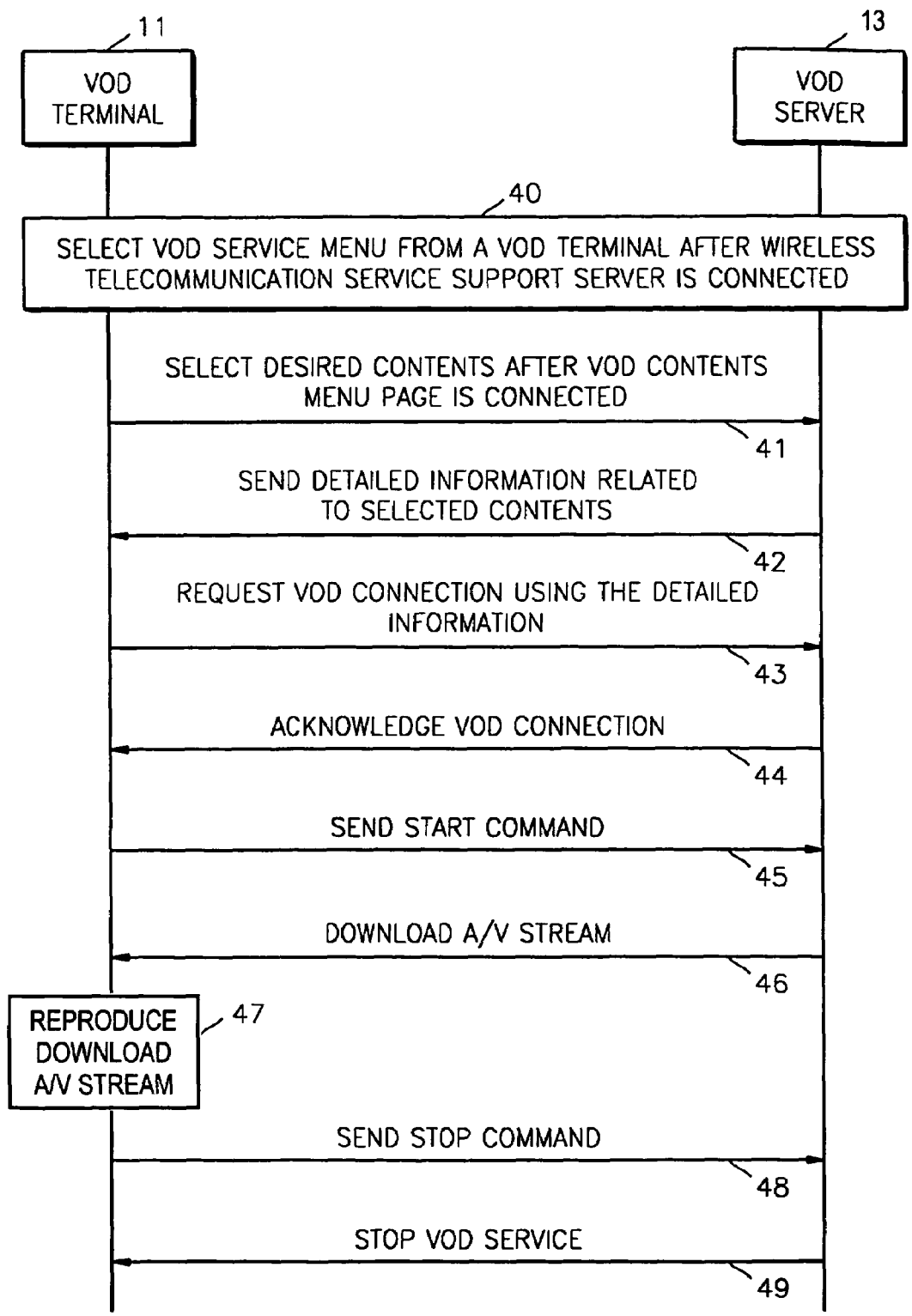
FIG. 4 is a flowchart showing the operation of a method for providing a VOD service in a wireless network environment according to the present invention.

FIG. 4 is a flowchart showing the operation of a method for providing a VOD service in a wireless network environment according to the present invention.

The method shown in FIG. 4 includes the steps of selecting from a VOD terminal a VOD service menu after a wireless telecommunications service support server is connected (step 40); selecting desired contents after a VOD contents menu page is connected (step 41); sending detailed information related to the selected contents (step 42); requesting VOD connection using the detailed information (step 43); acknowledging the VOD connection (step 44); sending a start command (step 45); downloading an A/V stream (step 46); reproducing the downloaded A/V stream (step 47); sending a stop command (step 48); and stopping the VOD service (step 49).

Referring to FIGS. 1 through 4, the present invention will now be explained in detail.

The VOD terminal 11 is connected to the wireless telecommunications service support server 12 through the wireless network 10, and selects a VOD service menu in step 40.

The VOD terminal 11 is formed by a WAP browser (not shown) and a VOD player (not shown), and the WAP browser of the VOD terminal 11 is connected to the wireless telecommunications service support server 12 and selects the VOD service menu. The wireless telecommunications service support server 12 provides diverse information, including information stocks, news, entertainment, among other things, through the wireless network in addition to the VOD service menu.

The WAP browser of the VOD terminal 11 is connected to a VOD contents menu page provided by the VOD server 13 and then selects desired contents in step 41.

The VOD server 13 provides VOD related services among wireless telecommunications services provided by the wireless telecommunications service support server 12, to the VOD terminal 11. At this time, the VOD server 13 stores predetermined content, including those from real-time broadcasts, audio and video recorders, which are converted by the encoder 14 after input from the outside and which are provided by VOD information providers, and predetermined Internet contents input through the converter 15. The VOD server 13 provides diverse services based on the stored VOD contents, to the VOD terminal 11.

The structure of the VOD server 13 providing VOD services is shown in FIG. 2. Internet information provided to the VOD server 13 is stored in the first DB 13-2 or the second DB 13-3 through the web gateway 13-1. Contents information from information providers of real-time broadcasts, audio and video recorders, is also stored in the first DB 13-2 or the second DB 13-3. In storing, video information among Internet information input through the web gateway 13-1 or contents information input from the outside is stored in the first DB, while non-video information among the Internet information and the contents information is stored in the second DB. Video information stored in the first DB 13-2 is converted into an image directory or file appropriate for the wireless telecommunications environment, in the multimedia CGI 13-4 and then stored in the third DB 13-6, while non-video information stored in the second DB 13-3 is converted into WML appropriate for the wireless telecommunications environment, in the CGI and scripts 13-5 and then stored in the third DB 13-6. That is, the third DB 13-6 stores WMLs converted in the multimedia CGI 13-4 and image directories or files converted in the CGI and scripts 13-5. Information appropriate for the wireless telecommunications environment, stored in the third DB 13-6 is provided to the VOD terminal 11 through the WAP gateway 13-7.

Information stored in the first and second DBs 13-2 and 13-3 can be updated to the latest information by information providers. On the multi-server shown in FIG. 3, contents can be formed in a cascade structure. The reason for the cascade structure is because the maximum capacity of a server is limited. With this kind of structure, the load can be distributed for processing. Also, the structure is for providing more diverse information to users with a large number of simultaneously-operating servers. Also, because of such a structure, the speed of contents updated by information providers can be improved and VOD terminals 11 can receive diverse information including real-time information.

The VOD server 13 provides detailed information related to the selected contents to the VOD terminal 11 in step 42. Detailed information provided by the VOD server 13 includes information such as the name of an application program, the location of a movie site (uniform resource locator, URL), version, port, among others. Using the provided information, the VOD terminal 11 requests the VOD server 13 to connect the VOD in step 43. That is, the VOD terminal 11 requests a connection to the desired movie site, for example, using detailed information. Responding to the connection from the VOD terminal, the VOD server acknowledges the VOD connection in step 44. After the acknowledgment from the VOD server, the VOD terminal 11 sends a start command for downloading movie information in step 45. When the start command is sent to the VOD server 13, the VOD server 13 downloads an audio/video (A/V) stream to the VOD terminal 11 and reproduces it in steps 46 and 47. After the start command is sent, the VOD server 13 provides information stored in the third DB 13-6 to the VOD terminal 11 through the wireless network. At this time, the VOD server 13 also sends function information such as fast forward, rewind, pause, in addition to the A/V stream so that the VOD terminal 11 can use function information by selecting it. When all information requested to the VOD terminal 11 is downloaded or reproduction is finished, a VOD service stop command is sent to the VOD server in step 48. The VOD service stop command can be sent during VOD information download. When the stop command is sent to the VOD server 13, the VOD service provided to the VOD terminal 11 is stopped in step 49.

The present invention is not restricted to the above-described embodiments, and many variations are possible within the spirit and scope of the present invention. According to the system, a VOD terminal user can receive VOD services and Internet services through a WAP in a wireless telecommunications environment so that information usage and satisfaction can be maximized.

What is claimed is:

1. A system for providing video-on-demand (VOD) services in a wireless network environment, the system comprising:
    a VOD terminal which displays video information;
    a wireless telecommunications server which provides a service menu for selection by the VOD terminal;
    a VOD server which provides service information related to a VOD item selected by the VOD terminal from the service menu provided by the wireless telecommunications server;
    an encoder which encodes video content input into the VOD server into a first format type to be stored in the VOD server; and
    a converter which converts non-video content input into the VOD server into a second format type to be stored in the VOD server,
    wherein the VOD server comprises:
        a first storage unit that stores video information input into the VOD server;
        a second storage unit that stores non-video information input into the VOD server;
        a first common gateway interface that converts the stored video information into image files for wireless telecommunications;
        a second common gateway interface that converts the stored non-video information into wireless markup language files for wireless telecommunications; and
        a third storage unit that stores the image files and the wireless markup language files.

2. The system of claim 1, wherein the VOD server comprises a plurality of servers, wherein VOD information providers provide information through the encoder and the converter, and VOD information providers can access the VOD server.

3. The system of claim 1, wherein the VOD server further comprises a WAP gateway coupled to the third storage unit to output the stored image files and the stored wireless markup language files.

4. The system of claim 1, wherein the VOD server further comprises a plurality of servers accessed by VOD information providers.

5. The system of claim 4, wherein the plurality of servers are coupled in a cascade structure.

6. A method for providing VOD services in a wireless network environment comprising a VOD terminal and a VOD server for providing video and voice services to the VOD terminal, wherein the method comprises:
    selecting, in the VOD terminal, a VOD service from a VOD service menu; and
    receiving the selected VOD service in the VOD terminal, wherein the VOD service comprises at least one of non-video content converted using wireless markup language and video content encoded into files for wireless telecommunications,
    wherein the VOD server stores video content in a first storage unit, converts the stored video content into image files that are stored in a third storage unit, and the VOD server stores non-video content is a second storage unit, converts the stored non-video content into wireless markup language files that are stored in the third storage unit.

7. The method of claim 6, wherein when the VOD terminal sends a stop command, the VOD server stops providing the VOD service.

* * * * *